United States Patent [19]

Kozlak et al.

[11] Patent Number: 5,234,021
[45] Date of Patent: Aug. 10, 1993

[54] NOZZLE DAMPER ASSEMBLY

[75] Inventors: Martin J. Kozlak, Enfield, Conn.; David K. Anderson, East Longmeadow, Mass.

[73] Assignee: Combustion Engineering, Inc., Windsor, Conn.

[21] Appl. No.: 825,347

[22] Filed: Jan. 24, 1992

[51] Int. Cl.⁵ .............................................. G05D 7/06
[52] U.S. Cl. .................. 137/487; 73/861.63; 137/502; 251/212
[58] Field of Search ........................ 73/861.62, 861.63; 137/487, 502; 251/212

[56] References Cited

U.S. PATENT DOCUMENTS

| | | | |
|---|---|---|---|
| 3,724,503 | 4/1973 | Cooke | 73/861.63 X |
| 4,481,828 | 11/1984 | Cheng | 73/861.63 |
| 4,796,651 | 1/1989 | Ginn | 137/487 X |
| 4,873,873 | 10/1989 | Day | 73/861.63 |

Primary Examiner—Robert G. Nilson
Attorney, Agent, or Firm—Arthur E. Fournier, Jr.

[57] ABSTRACT

A nozzle damper assembly (10) for installation in a duct (12) operative for measuring and controlling the flow of a gaseous medium through the duct (12). The subject nozzle damper assembly (10) includes enclosure means (24) cooperatively associated with the duct (12), shaft means (26) suitably supported from the sidewalls (32, 34, 36, 38) of the enclosure means (24), damper blade means (16,18) rotatable mounted on the shaft means (26) for movement within the enclosure means (24), damper blade operating means (28) operative for purposes of effecting the movement of the damper blade means (16,18) within the enclosure means (24), and flow measurement means (20,22) supported at a first location and at a second location relative to in lieu thereof the damper blade means (16,18) and operative to measure the flow of the gaseous medium through the nozzle damper assembly (10) such that control may be exercised over the flow of the gaseous medium through the duct (12) based on such measurements.

4 Claims, 12 Drawing Sheets

NOZZLE DAMPER ASSEMBLY

BACKGROUND OF THE INVENTION

This invention relates to devices for controlling the flow of a medium through a conduit, and more specifically, to a nozzle damper assembly for controlling as well as measuring the flow of a gaseous medium through a duct.

It has long been known in the prior art to provide devices operable for controlling the flow of a medium through a conduit. More specifically, the prior art is replete with examples of various types of devices that have been used heretofore to effect control over the flow of a medium through a conduit. In this regard, in many instances discernible differences of a structural nature can be found to exist between individual ones of the aforesaid devices. The existence of such differences is, in turn, attributable for the most part to the diverse functional requirements that are associated with the individual applications in which such devices are designed to be employed. For instance, in the selection of the particular type of device that is to be utilized for a specific application, one of the principal factors to which consideration must be given is that of the nature of the medium, the flow of which is to be controlled by the device. Gaseous mediums are one such type of medium wherein there is a need to control the flow thereof through a conduit. Furthermore, the air flow to a pulverizer as well as the air flow to other forms of equipment that are utilized in power generation systems are representative of applications in which there is a need to effect control over the flow of a gaseous medium as well as a need in some instances to effect, in addition, measurements of the flow of the gaseous medium.

By way of exemplification and not limitation, one particular type of flow control device heretofore known in the prior art forms the subject matter of U.S. Pat. No. 3,749,115. As set forth in U.S. Pat. No. 3,749,115, industrial plants commonly employ ducts for conducting various types of gaseous fluids. Moreover, where it is desired to regulate or to terminate the flow of such fluids through a duct, dampers are employed. In large ducts of extended lateral dimensions a plurality of aligned, mutually cooperating dampers are employed to close the duct passage. A totally effective seal of the duct passage is not possible in actual practice solely by means of a cooperation between adjacent dampers due to the difficulty in achieving a fluid tight metal-to-metal seal. This is caused principally by the fact that warpage of the members normally occurs when the dampers are disposed in a high temperature environment or particulate matter is deposited on the mating surfaces of adjacent members when they are disposed in an unclean atmosphere thereby preventing the mating surfaces from seating properly. A combination of both conditions prevails in some applications such as, for instance, the combustion gas duct of vapor generators.

Therefore, in accordance with the teachings of U.S. Pat. No. 3,749,115, a flow damper apparatus of relatively inexpensive construction is provided that is effective to positively prevent the flow of controlled gaseous fluid in a duct passage. To this end, the dampers are formed as hollow bodies and are connected to a source of sealing fluid. In addition, oppositely spaced seal plates disposed along the edges of the damper bodies form spaces between adjacent dampers into which sealing fluid is directed thereby forming a fluid seal between the upstream and downstream sides of the damper apparatus.

By way of exemplification and not limitation, another prior art type of flow control device forms the subject matter of U.S. Pat. No. 3,854,500. More specifically, U.S. Pat. No. 3,854,500 is directed to large fluid shut-off valves of the gate type. Gate valves, as set forth in U.S. Pat. No. 3,854,500, are widely used in the control of large fluid flows because of the desirable flow characteristics produced by their unimpeded flow-through construction. The typical gate valve consists merely of a valve body with a through passage for the flow of liquid and a transverse track or seat which permits and guides the movement of a plate-like gate for flow blocking. A large number of problems are inherent, however, in the operation of such gate valves.

To this end, in accordance with the teachings of U.S. Pat. No. 3,854,500 a gate valve is provided that is designed to overcome the cocking, warping, linear expansion friction due to high pressures, and fluid leakage problems experienced by the prior art. Furthermore, the nature of the construction of the gate valve of U.S. Pat. No. 3,854,500 is such that the driving or closing means is connected to the gate by a centrally located pivotal connection, thereby allowing closing and opening of the valve without blade cocking. Moreover, a multiparallel gate is proposed to reduce the size of the individual gates thereby reducing the large thermal warp observed in one large gate. Gates of reduced size also reduce the overall linear temperature expansion observed in large gates, thus allowing smaller clearances and reduced gas leakage. To overcome the friction problem resulting from high pressures pressing on the gate valve, the nature of the construction of the gate valve of U.S. Pat. No. 3,854,500 is such that an air cushion support lifts the gate against the high pressure and allows low friction opening of the gate. This support consists of pressurized air which is admitted to a series of end-to-end grooves whose openings face upstream and face the edge portion of the downstream face of the gate. Pressurized air is admitted to each groove by valves triggered by the movement of the gate. Finally, the gate sealing means consists of a plurality of longitudinal grooves arranged in the valve body facing upstream and parallel to the direction of movement of the gate. The gate blade's edges slide along and overlie the grooves creating close metal-to-metal contact and a labyrinthian seal.

By way of exemplification and not limitation, yet another prior art type of flow control device forms the subject matter of U.S. Pat. No. 3,889,552. More specifically, U.S. Pat. No. 3,889,552 is directed to an actuating device for multiple dampers. As set forth in U.S. Pat. No. 3,889,552, it is known that during low load operation of large steam generators, vibration of the induced draft fan or gas recirculation fan is sometimes encountered. In this regard, the inlets to these fans are controlled by a multitude of small coacting dampers extending across the width of the inlet ducts. Furthermore, it has been determined that one way of reducing fan vibration problems is to have a fine control over the damper positions during low load operation, and to allow flow through only selective dampers.

To this end, in accordance with the teachings of U.S. Pat. No. 3,889,552 a single actuating device is provided which permits initial opening of one or more of a plurality of dampers, while the other dampers remain in their closed position. The actuating device further accomplishes full opening of all of the dampers simultaneously. The actuating device comprises a linkage arrangement having a dogleg link therein for accomplishing the above.

Yet still another prior art form, by way of exemplification and not limitation, of flow control device forms the subject matter of U.S. Pat. No. 4,182,359. More specifically, U.S. Pat. No. 4,182,359 is directed to a slide gate damper. As set forth in U.S. Pat. No. 4,182,359 it has been known in the prior art that in large ducts gate valves are often used for closing the ducts from flow therethrough. Such gate valves are positioned on one side of the duct, and are moved transversely so they extend entirely across the span of the duct when in a closed position, with the leading edge seating in an end frame. Moreover, when the duct is conveying hot gases, the large span of the gate can warp, causing proper seating problems in the end frame. Also, when the gases are dust laden, the dust can become trapped in the end frame, preventing proper seating of the gate valve. Further, if there is a need for a concentric pipe, or other control obstruction in the large duct, it is presently impossible to position a gate valve at this location.

To this end, in accordance with the teachings of U.S. Pat. No. 4,182,359 a double gate valve arrangement is provided with the gates being positioned diametrically opposite each other, so they close and seat in the middle of the duct. In addition, the leading edge of each gate is tapered back from the side edges so that they will properly seat even if they are slightly warped from the seat. Finally, an air seal is provided to prevent any leakage through the gate.

Although flow control devices constructed in accordance with the teachings of the four issued U.S. patents to which reference has been made heretofore have been demonstrated to be operative for the purpose for which they have been designed, there has nevertheless been evidenced in the prior art a need for such flow control devices to be further improved. For example, desirably such flow control devices should possess the capability of being able to not only control but also of being able to simultaneously measure the flow of a gaseous medium through a duct. Moreover, there has been evidenced in the prior art a need for a new and improved flow measuring and control device which would permit a wider range of flow rates to be handled than that which is possible with a fixed throat area device such as a venturi or flow nozzle. Namely, whereas prior art forms of flow control devices often times have been limited to a turndown of 4 to 1, there has been evidenced in the prior art a need for a new and improved measuring and control device with which one would be able to achieve a much wider range of turndown ratios, e.g., on the order of up to 40 to 1. In addition, there has been evidenced in the prior art a need for a new and improved flow measuring and control device with which one is capable of achieving a turndown ratio of up to 40 to 1 and wherein furthermore it is possible by varying the throat area thereof to maintain virtually a constant differential pressure throughout this entire turndown ratio of up to 40 to 1. Another characteristic which such a new and improved flow measuring and control device desirably should possess is that it be relatively short in length so as to, therefore, facilitate its installation in a duct. It is to be noted in this regard that the ducts in which such a new and improved flow measuring and control device would be designed to be used commonly would be on the order of five feet by five feet, six feet by six feet, etc., depending upon the nature of the specific application in which the new and improved flow measuring and control device is being employed. Yet another characteristic which such a new and improved flow measuring and control device desirably should possess is that it be relatively simple in construction. To this end, such a new and improved flow measuring and control device should embody, to the extent possible, a modular form of construction so as to, therefore, facilitate the manufacture, transport and installation thereof. Thus, by way of summarization a need has been evidenced in the prior art for such a new and improved flow measuring and control device that is suitable for use for purposes of effectuating the simultaneous measurement and control of the flow of a gaseous medium such as air through a duct enroute to a pulverizer or to some other forms of equipment of the type that are commonly employed in power generation systems.

It is, therefore, an object of the present invention to provide a new and improved flow control device suitable for use for purposes of effectuating control over the flow of a gaseous medium through a conduit.

It is a further object of the present invention to provide such a flow control device that possesses the capability of being able to not only control the flow but also the capability of being able to simultaneously measure the flow of a gaseous medium through a conduit.

It is another object of the present invention to provide such a flow measuring and control device that is particularly suited for use in measuring and controlling the air flow entering exhauster-type pulverizers.

It is still another object of the present invention to provide such a flow measuring and control device that is particularly suited for use in measuring and controlling the air flow entering forms of equipment which are employed in power generation systems other than exhauster-type pulverizers.

A further object of the present invention is to provide such a flow measuring and control device particularly suited for use in measuring and controlling the flow of a gaseous medium through a conduit which is characterized in that it is possible therewith to handle a wider range of flow rates than that which is possible with a fixed throat area device such as a venturi or flow nozzle.

A still further object of the present invention is to provide such a flow measuring and control device particularly suited for use in measuring and controlling the flow of a gaseous medium through a conduit which is characterized in that it possesses the capability of enabling a much wider range of turndown ratios to be attained therewith, e.g., up to 40 to 1, as contrasted to prior art forms of flow control devices which oftentimes have been limited to turndown ratios of 4 to 1.

A still another object of the present invention is to provide such a flow measuring and control device particularly suited for use in measuring and controlling the flow of a gaseous medium through a conduit which is characterized in that it possesses the capability of being either manually operated or remotely operated.

Yet a further object of the present invention is to provide such a flow measuring and control device particularly suited for use in measuring and controlling a gaseous medium through a conduit which is characterized in that it is relatively short in length so as to, therefore, facilitate its installation in a conduit.

Yet another object of the present invention is to provide such a flow measuring and control device particularly suited for use in measuring and controlling the flow of a gaseous medium through a conduit which is characterized in that it embodies a modular form of construction thereby facilitating the manufacture, transport and installation thereof.

Yet still another object of the present invention is to provide such a flow measuring and control device particularly suited for use in measuring and controlling the flow of a gaseous medium through a conduit which is equally applicable for employment in new installations as well as in retrofit applications.

SUMMARY OF THE INVENTION

In accordance with the present invention there is provided a nozzle damper assembly which is particularly suited for use in power generation applications for purposes of effecting the measurement and control of the flow of air through a duct. The subject nozzle damper assembly includes enclosure means, shaft means, damper blade means, damper blade operating means, and flow measurement means. The enclosure means is suitably designed so as to be capable of being cooperatively associated with the duct in which it is desired to employ the subject nozzle damper assembly. The shaft means is suitably supported from opposing sidewalls of the enclosure means. The damper blade means is mounted on the shaft means for movement rotatable within the enclosure means. The damper blade operating means is operatively connected to the damper blade means and is operative for purposes of effecting the movement of the damper blade means within the enclosure means. The flow measurement means is suitably supported at a first location and at a second location relative to in lieu thereof the damper blade means such as to be operative to measure the air flow through the nozzle damper assembly whereby control may be exercised over the flow of air through the subject nozzle damper assembly and thereby through the duct based on such measurements.

DESCRIPTION OF A PREFERRED EMBODIMENT

Figure 1:
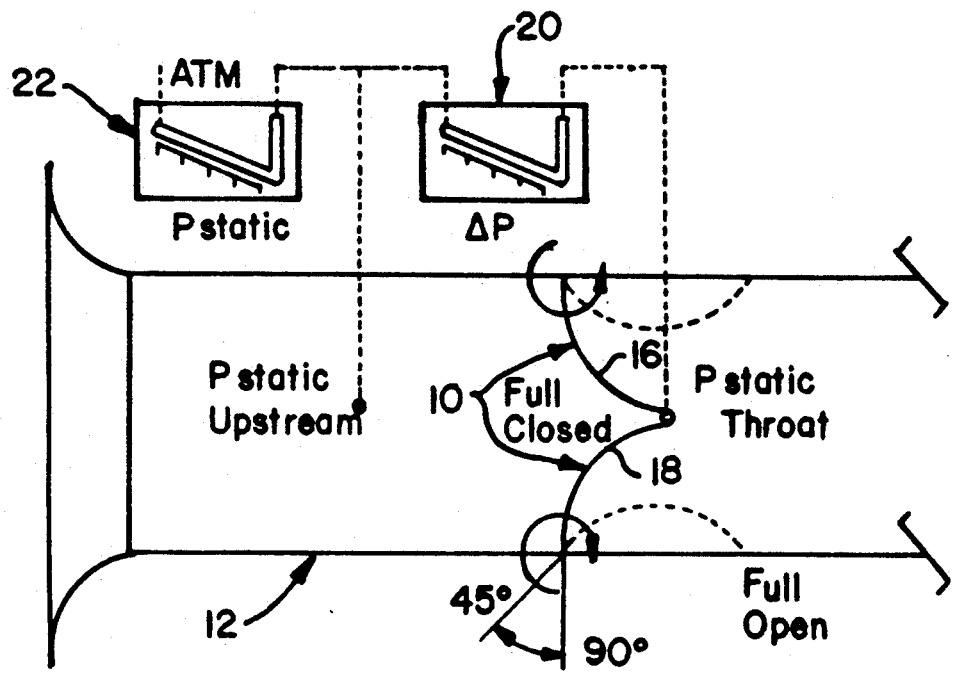
FIG. 1 is a schematic illustration of a nozzle damper assembly constructed in accordance with the present invention shown installed in a duct.

Referring now to the drawing, and more particularly to FIG. 1 thereof, there is depicted therein a nozzle damper assembly, generally designated by the reference numeral 10 constructed in accordance with the present invention and shown installed in a duct, generally designated by the reference numeral 12. The nozzle damper assembly 10 is particularly suited for use in effectuating simultaneously the measurement and control of the flow of a gaseous medium such as air through a duct, such as the duct 12 of FIG. 1, enroute to a pulverizer (not shown) or to some other forms of equipment (not shown) of the type that are commonly employed in power generation applications.

The nozzle damper assembly 10, as will be described herein in considerably more detail subsequently, embodies a pair of opposed damper blades, denoted by the reference numerals 16 and 18, respectively, in FIG. 1. Each of the damper blades 16 and 18 comprises a 90° arc with a radius equal to one-half of the height of the duct 12. As so constructed, the nozzle damper assembly 10 is limited in use to ducts having a rectangular configuration.

Continuing, the damper blades 16 and 18 are each hinged at their leading edge, in a manner to be more fully described herein subsequently, such that the center of the rotation of each of the damper blades 16 and 18 is at the wall of the duct 12. For purposes of this discussion, the minimum and maximum angles of rotation of the damper blades 16 and 18 are taken to be the included angle formed by the wall of the duct 12 and the tangent line at the hinge point of the respective one of the damper blades 16 and 18. Thus, there is provided a means of determining the open area of the throat of the nozzle damper assembly 10 through indication of the angle of rotation of the damper blades 16 and 18. To this end, based on the geometry of the nozzle damper assembly 10, a range from 45° at the full open condition to 90° at the full closed position is provided.

The basic rationale behind developing the nozzle damper assembly 10, which forms the subject matter of the present patent application, resides in the fact that this type of flow measuring and control device enables a wider range of flow rates to be handled than with a fixed throat area device such as a venturi or flow nozzle. In this regard, there will arise occasions depending upon the operating requirements of the particular application wherein the flow rate through a fixed area device will be reduced to levels that would be difficult to measure because of the low differential pressure that is present. On the other hand, it is possible with the nozzle damper assembly 10 to close the damper blades 16 and 18 thereof to the point wherein the throat area of the nozzle damper assembly 10 nevertheless provides enough of a restriction that the resulting differential pressure is still large enough to be accurately measured by conventional pressure sensing equipment such as of the type, which is denoted generally by the reference numerals 20 and 22 in FIG. 1 of the drawing.

Before proceeding with a discussion of the effects of damper blade stroke on the quantity of flow through the nozzle damper assembly 10 of FIG. 1, a discussion will first be had herein of the basis for the measurement of differential pressure that has been referred to hereinbefore. By doing so, a better understanding, it is believed, will be had of the variability of the throat area as well as of the relationship thereof to both the angle of the damper blades 16 and 18 and the measurement of flow through the nozzle damper assembly 10.

It is thought that the easiest way to approach the measurement of flow with a device such as the nozzle damper assembly 10 of FIG. 1, which is capable of producing a differential pressure, is to begin with the concept of Continuity and Bernoulli's Equation. To this end, if one assumes that the air flow is incompressible and that there is no storage of the air flow between the upstream and downstream measurement points, then the air that goes into the nozzle damper assembly 10 must come out in the equivalent amount. This is expressed mathematically as:

$$P_1 A_1 V_1 = P_2 A_2 V_2$$

Further, Bernoulli's Equation indicates that the energy along a streamline remains constant for an incompressible, nonviscous fluid. This is written as:

$$P_s/p + V^2/2g_c = \text{constant}$$

Continuing, if ideal conditions and a constant air density are assumed, then the energy content of the flow exiting the nozzle damper assembly 10 of FIG. 1 is going to be equal to that of the flow entering the nozzle damper assembly 10. This ideal flow situation may be written as:

$$P_{s1}/p + V_1^2/2g_c = P_{s2}/p + V_2^2/2g_c$$

Moreover, given that the static pressure $P_s$ can be measured at the entrance to the nozzle damper assembly 10 where the area of the duct 12 is $A_1$ as well as at the throat of the nozzle damper assembly 10 where the area is $A_2$, then the difference of the two static pressures can be written as:

$$\Delta P_s = pV_2^2/2g_c - pv_1^2/2g_c \qquad \text{(lb/ft}^2\text{)}$$

Given a constant density, one can, based on the concept of Continuity, relate the throat velocity to upstream velocity as:

$$V_1 = V_2(A_2/A_1) \qquad \text{(ft/sec)}$$

Further, by substituting for $V_1$ in the previous equation and by rearranging, there is obtained the following:

$$V_2 = \{[(2g_c/p)(\Delta P_s)]/[1-(A_2/A_1)^2]\}^{1/2} \qquad \text{(ft/sec)}$$

Additionally, it is known from the concept of Continuity that the flow rate through the duct 12 is equal to the flow rate through the nozzle damper assembly 10 so that the mass flow rate can be expressed as:

$$M = pA_2/V_2 \qquad \text{(lb/sec)}$$

Moreover, if one defines the area ratio as the throat area divided by the upstream area of the duct 12, i.e., as $A_2/A_1$, then one may define the square root of this quantity as the Beta Ratio, B. Therefore, $$A_2 = A_1(A_2/A_1) = A_1(B^2) \qquad \text{(ft}^2\text{)}$$

Thus, by substituting for $A_2$ and $V_2$, the equation for the mass flow rate through the nozzle damper assembly 10 becomes:

$$M = pA_1(B^2)/[(2g_c/p)(\Delta P_s)/(1-B^4)]^{1/2} \qquad \text{(lb/sec)}$$

This last equation for M does not take into account any deviations from the ideal flow situation. These non-idealities are taken into account in the following equation for mass flow and are briefly defined below. However, since a discussion of these non-idealities is available in any text on flow measurement, no further discussion thereof will be had herein. Suffice it to say that the resulting equation for mass flow rate is:

$$M = K(B^2)(A_D)(C_d)(Y)(F_a)\{h(P_s+P_B)/[T(1-B^4)]\}^{1/2} \qquad \text{(lb/min)}$$

where:

| | |
|---|---|
| B = square root of the area ratio | (dimensionless) |
| $A_D$ = duct area | (ft$^2$) |
| $C_d$ = discharge coefficient | (dimensionless) |
| Y = gas expansion factor | (dimensionless) |
| $F_a$ = thermal expansion factor | (dimensionless) |
| h = effective differential pressure | (in · wg) |
| $P_s$ = upstream static pressure | (PSIG) |
| $P_B$ = barometric pressure | (PSIA) |
| T = air temperature | (°R.) |
| K = constant | |

Moreover, for purposes of this equation the constant, K, has units of:

$$[(lb \cdot °R)^{1/2} in.]/[ft2(in.wg)^{1/2} min]$$

The equation for mass flow rate, which is set forth above, was used to determine the flow rates that were obtained during testing of the nozzle damper assembly 10 of FIG. 1.

Having defined the performance of the nozzle damper assembly 10 of FIG. 1 for a given throat area in the mass flow equation which is set forth above, it is now necessary to be able to relate the Beta Ratio to changes in the position of the damper blades and 18.

The rotational angle of the damper blade shaft is the one quantity available for determining the position of the damper blades 16 and 18 and, therefore, the throat area. This relationship is described as follows:

1. The radius of the damper blades 16 and 18 is R which is equal to one-half of the height of the duct 12.

2. The maximum intrusion of the damper blades 16 and into the duct 12 can be related to the damper blade rotational angle, $\phi$, by:

$$y = R[1 - (\cos \phi)].$$

3. Given that the height of the duct 12 is equal to 2R and that the throat is the height of the duct 12 minus the combined intrusion of the damper blades 16 and 18 at a given damper blade shaft angle $\phi$, then the throat height is:

$$h = 2R(\cos \phi).$$

4. The ratio of the area of the throat ($A_T$) to the area of the duct 12 ($A_D$) is:

$$A_T/A_D = hW/HW = 2R(\cos \phi)/2R = \cos \phi$$

where W is the width of the duct 12 (and that of the damper blades 16 and 18).

5. The Beta Ratio is defined as the square root of the area ratio $A_T/A_D$ which leads to the relationship:

$$B = \sqrt{\cos \phi}$$

Therefore, substituting $\cos \phi$ for $B^2$ and utilizing trigonometric identities yields the following equation for nozzle damper flow rate:

$$M = K(A_D/\tan \phi)(C_d)(Y)(F_a)\{h(P_s + P_B)/T\}^{1/2} \quad \text{(lb/min)}$$

It should thus be readily apparent from the preceding discussion that the ability to reduce the open area of the throat of the nozzle damper assembly 10 of FIG. 1 permits a reduction in the mass flow rate while still maintaining a signal level that can be accurately read. This means that the differential pressure which is generated is controlled by the available open area of the nozzle throat as well as the actual flow rate. Furthermore, by relating the change in throat area to a change in the position of the damper blade shaft, the position of the damper blades 16 and 18 enters into the mass flow rate equation as B and becomes as much a variable as the differential pressure. As such, a much wider range of control is achieved than was previously possible with a fixed throat area design.

This increased turndown capability of the nozzle damper assembly 10 of FIG. 1 can be illustrated as follows:

1. Assume that $C_d$, Y, $F_a$, h, $P_s$, $P_B$ and T are constants.

2. Based on 1. above, $\Delta M = f(B)$ where B can be defined as $\sqrt{\cos \phi}$, and $\phi$ is the rotational angle of the damper blades 16 and 18 for the range $45° \leq \phi \leq 90°$.

3. If the mass flow rate M is changed by reducing the throat open area of the damper blades 16 and 18 then:

$$M_1/M_2 \sim [(A_D^2/A_{T1}^2) - 1]/[(A_D^2/A_{T2}^2) - 1].$$

4. By definition, the area ratio $A_T/A_D$ equals $B^2$ which in turn equals $\cos \phi$. Thus, through substitution:

$$M_1/M_2 \sim [(1 - \cos^2\phi_1)/\cos^2\phi_1]/[(1 - \cos^2\phi_2)/\cos^2\phi_2].$$

5. By using the identities $\sin^2\phi = 1 - \cos^2\phi$ and $\sin\phi/\cos\phi = \tan \phi$ and then substituting:

$$M_1/M_2 \sim [\tan^2\phi_1]/[\tan^2\phi_2].$$

6. At the full open condition of the damper blades 16 and 18, $\phi_1$ is equal to 45° and $\tan \phi_1$ equals 1. As such, the mass flow rate as a function of the throat area is defined by the reciprocal of the square of the tangent of the damper shaft rotational angle:

$$M_1/M_2 \sim 1/\tan^2\phi_2$$

Thus, it should be readily apparent from the preceding that if the turndown ratio is 10, then the damper blade rotational angle will be about 85°. This ability to obtain a 10 to 1 turndown on the mass flow rate at a constant pressure is augmented by the nominal range of the pressure sensing equipment, which is schematically depicted at 20 and 22 in FIG. 1 of the drawing. Namely, a typical pressure sensor can be set up to provide a 4 to 1 turndown on the mass flow rate for a fixed measurement device geometry. Therefore, combining the two ranges, i.e., that created by the throat area adjustment and that of the pressure sensor, yields a total turndown capability on the mass flow rate of 40 to 1.

Reference will now be had particularly to FIGS. 2–6 of the drawing for purposes of describing the nature of the construction and the mode of operation of one embodiment of nozzle damper assembly 10. It should be noted here that the embodiment of nozzle damper assembly 10, which is depicted in FIGS. 2–6 of the drawing, is characterized by the fact that the positioning of the damper blades 16 and 18 thereof is done manually as contrasted to the embodiment of nozzle damper assembly 10, which is depicted in FIGS. 7–10 of the drawing, wherein the positioning of the damper blades 16 and 18 thereof is accomplished by pneumatic means. Note is further taken here of the fact that as has been mentioned previously herein the nozzle damper assembly 10 is particularly suited for inclusion in a duct such as the duct depicted at 12 in FIG. 1 of the drawing.

Figure 2:
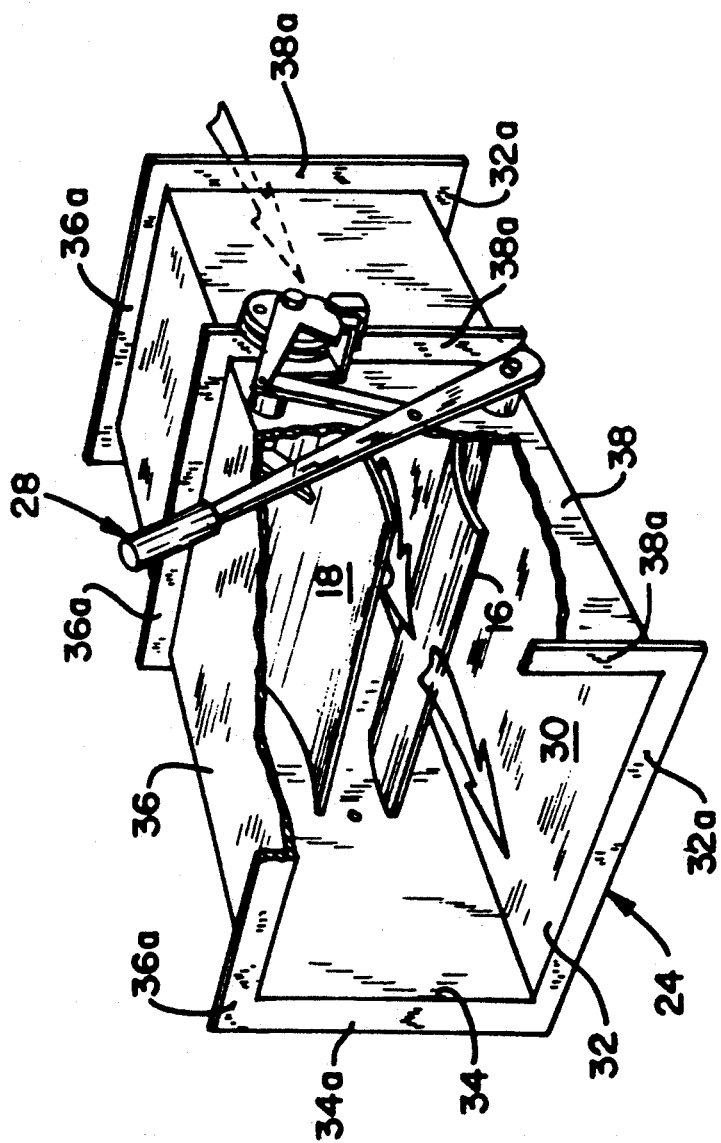
FIG. 2 is an isometric view of a nozzle damper assembly, with the flow measurement means thereof omitted in the interest of clarity of illustration, constructed in accordance with the present invention shown installed in a duct.
Figure 3:
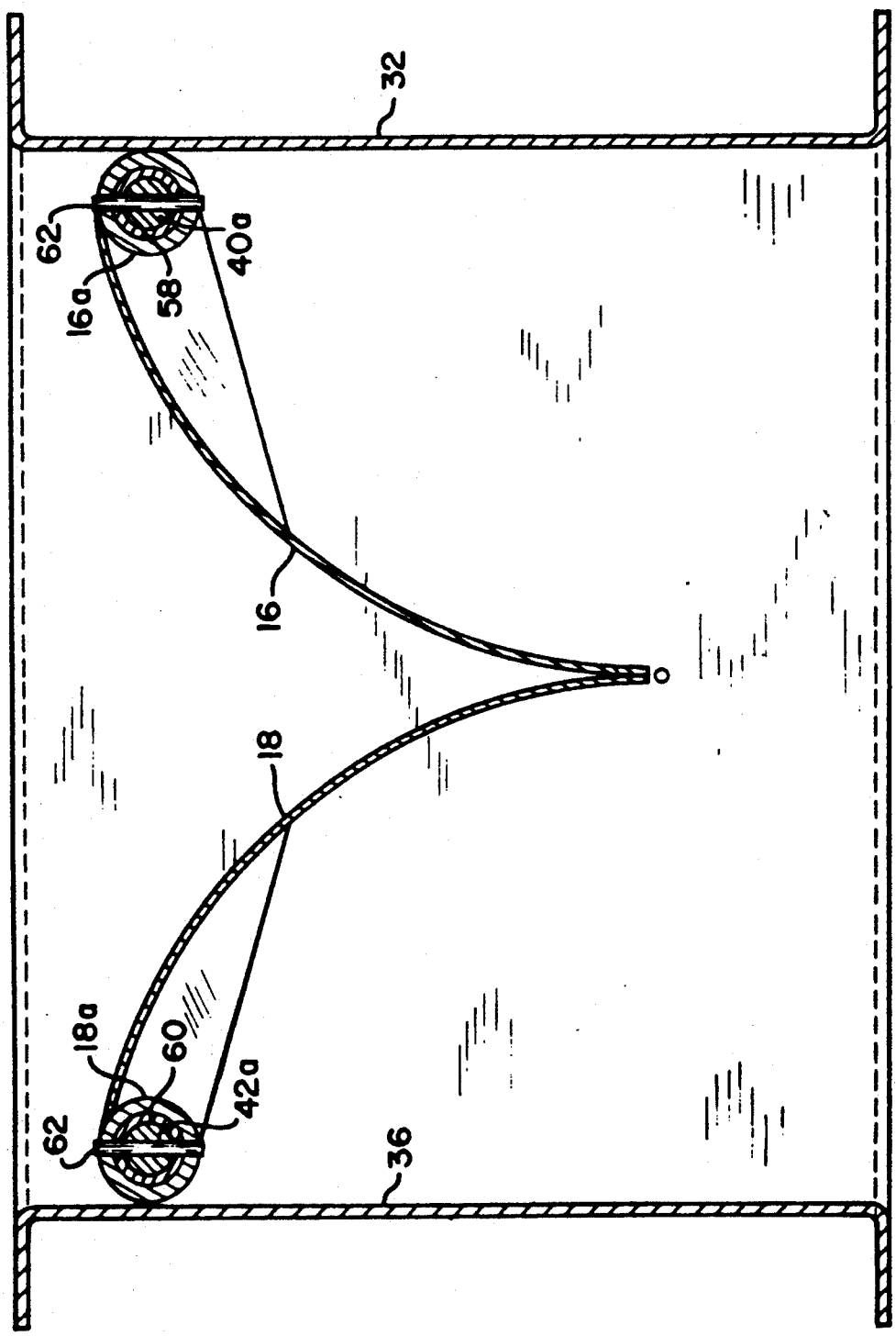
FIG. 3 is a side elevational view in section of the damper means of one embodiment of a nozzle damper assembly constructed in accordance with the present invention.
Figure 4:
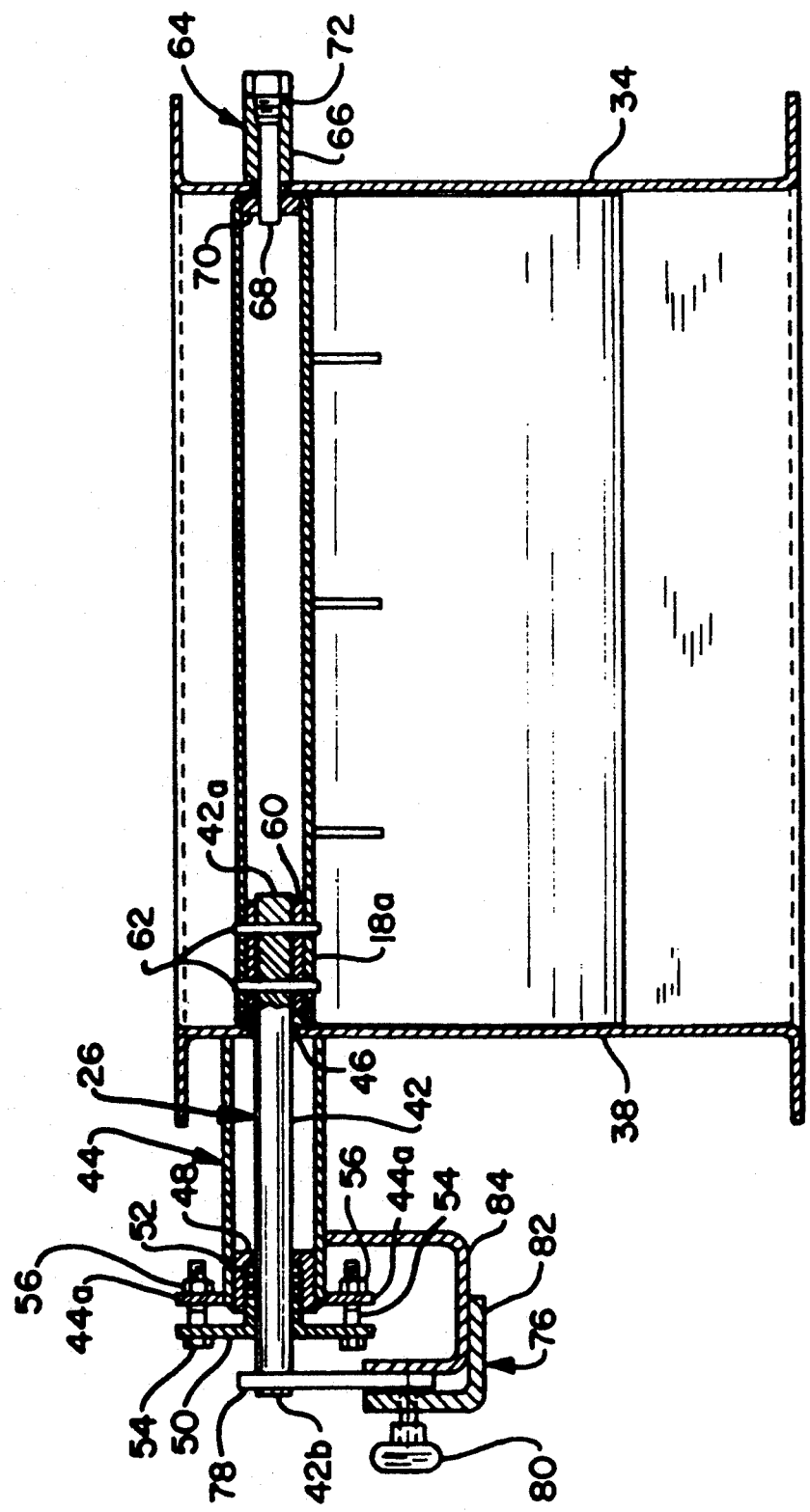
FIG. 4 is a side elevational view in section of the shaft means of the nozzle damper assembly of the embodiment of FIG. 3 constructed in accordance with the present invention.
Figure 5:
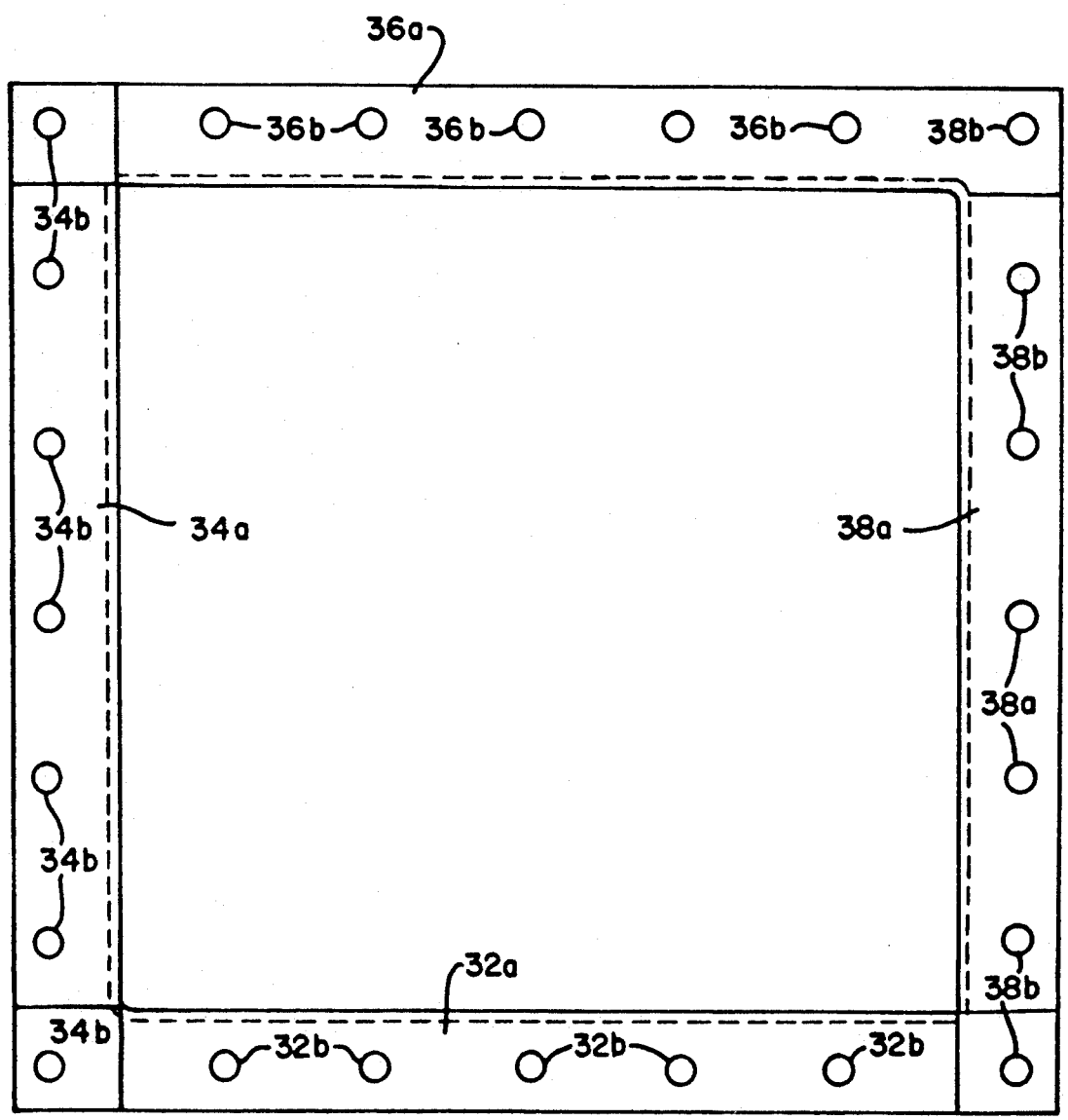
FIG. 5 is a side elevational view of the enclosure means of a nozzle damper assembly constructed in accordance with the present invention.

Continuing, in accordance with the present invention the embodiment of nozzle blade assembly 10, which is depicted in FIGS. 2–6 of the drawing, comprises enclosure means denoted generally in FIG. 2 by the reference numeral 24, shaft means denoted generally in FIG. 4 by the reference numeral 26, damper blade means including the damper blades 16 and 18 to which reference has been had herein previously in the course of the discussion of FIG. 1 of the drawing, damper blade operating means denoted generally in FIG. 2 by the reference numeral 28, and flow measurement means including the pressure sensing equipment 20 and 22 to which reference has been had herein previously in the course of the discussion of FIG. 1 of the drawing. In the interest of maintaining clarity of illustration in the drawing, the aforementioned flow measurement means including the pressure sensing equipment 20 and 22 thereof has been omitted from each of FIGS. 2–6 of the drawing.

The enclosure means 24, as best understood with reference to FIGS. 2–5 of the drawing, consists of a damper body 30 that is suitably dimensioned and configured so as to conform to the external dimensions and configuration of the duct 12 with which the nozzle damper assembly 10 of the present invention is intended to be employed. To this end, the damper body 30 consists of four sidewalls 32, 34, 36 and 38, which are suitably joined to one another by means of any conventional form of joining means (not shown) suitable for use for this purpose such as, for example, by being welded to one another. As so joined, the sidewalls 32 and 36 extend parallel to one another and at right angles to each of the sidewalls 34 and 38. Furthermore, in accordance with the preferred embodiment of the invention each of the sidewalls 32, 34, 36 and 38 is preferably provided with flange portions 32a, 34a, 36a and 38a, respectively. These flange portions 32a, 34a, 36a and 38a are intended to be utilized for purposes of securing the nozzle damper assembly 10 in place relative to the duct 12 through the use of a multiplicity of conventional fasteners (not shown). These fasteners (not shown) are intended to be inserted through the openings 32b, 34b, 36b and 38b, which are provided for this purpose in the flanges 32a, 34a, 36a and 38a, respectively, as will be best understood with reference to FIG. 5 of the drawing. Although in accordance with the illustration thereof in FIGS. 2-6 of the drawing, the nozzle damper assembly 10 is designed to be secured in place relative to the duct 12 through the use of a multiplicity of conventional fasteners (not shown), it is to be understood that other means might be utilized for this purpose without departing from the essence of the present invention.

A description will next be had herein of the shaft means 26. For this purpose reference will be had in particular to FIGS. 3 and 4 of the drawing. As best understood with reference to FIG. 3, the shaft means 26 includes a pair of shaft members, which are denoted in FIG. 3 by the reference numerals 40 and 42. The damper blades 16 and 18 to which reference has been had herein previously are mounted on the shaft members 40 and 42, respectively, in a manner that will be described more fully hereinafter. The shaft members 40 and 42 themselves are suitably supported in mounted relation on the sidewalls 34 and 38 of the damper body 30 as best seen with reference to FIG. 4 of the drawing.

Inasmuch as each of the shaft members 40 and 42 is supported in mounted relation on the sidewalls, 34 and 38 of the damper body 30 in the identical manner, it is deemed adequate for purposes of acquiring an understanding of the present invention that there be set forth herein only a description of the manner in which the shaft member 42 is supported in mounted relation on the sidewalls 34 and 38. To this end, as best understood with reference to FIG. 4 of the drawing the shaft member 42 is suitably supported within a bearing and stuffing box assembly generally denoted by the reference numeral 44 in FIG. 4. More specifically, the shaft member 42 extends through the bearing and stuffing box assembly 44 and has one end thereof denoted by the reference numeral 42a in FIG. 4, which projects through an opening 46 formed for this purpose in the sidewall 38 of the damper body 30. The other end, which is denoted by the reference numeral 42b, of the shaft member 42 passes through a U-shaped member 48 and then through a packing gland 50. In accord with the best mode embodiment of the invention, fiber glass rope denoted by the reference numeral 52 is preferably interposed between the U-shaped member 48 and the packing gland 50 in surrounding relation to the end 42b of the shaft member 42. With further reference to FIG. 4 of the drawing, the packing gland 50 as depicted therein is suitably secured to the bearing and stuffing box assembly 44 preferably by means of a plurality of conventional fasteners denoted by the reference numeral 54 which after passing through suitable openings (not shown) provided for this purpose in the packing gland 50 and corresponding openings (not shown) formed in a plurality of outwardly projecting lugs 44a with which the bearing and stuffing box assembly 44 is suitably provided for this purpose are threadedly engaged in conventional nuts seen at 56 in FIG. 4 of the drawing. Finally, by way of reiteration it is to be understood that the shaft member 40, although it has not been so described herein, is supported in mounted relation on the sidewalls 34 and 38 of the damper body 30 in the same manner that the shaft member 42 as has been described hereinbefore is supported in mounted relation on the sidewalls 34 and 38 of the damper body 30.

Next, a discussion will be had herein of the manner in which the damper blades 16 and 18 of the damper blade means of the nozzle damper assembly 10 of the present invention are suitably mounted in supported relation on the shaft members 40 and 42, respectively. Reference will be had for this purpose in particular to FIGS. 3 and 4 of the drawing. Thus, as best understood with reference to FIG. 3 of the drawing one end thereof, denoted by the reference numerals 16a and 18a, respectively, of each of the damper blades 16 and 18 terminates in a coiled portion suitably dimensioned so as to be capable at one end thereof of receiving therewithin one end, denoted by the reference numeral 40a, of the shaft member 40 in the case of the shaft member 40 and the end 42a of the shaft member 42 in the case of the shaft member 42. Also, a bearing member denoted by the reference numeral 58 preferably is interposed between the end 40a of the shaft member 40 and the coiled portion 16a of the damper blade 16. Likewise, a bearing member denoted by the reference numeral 60 preferably is interposed between the end 42a of the shaft member 42 and the coiled portion 18a of the damper blade 18. In accord with the illustrated embodiment of the invention a pair of roll pins denoted by the reference numeral 62 suitably spaced one from another are employed for purposes of retaining the bearing member 58 and one end of the coiled portion 16a of the damper blade 16 in secured relation to the end 40a of the shaft member 40, and for purposes of retaining the bearing member 60 and one end of the coiled portion 18a of the damper blade 18 in secured relation relative to the end 42a of the shaft member 42. Note is made here of the fact that only one roll pin 62 is visible in FIG. 3 of the drawing associated with the coiled portion 16a of the damper blade 16 and the coiled portion 18a of the damper blade 18, respectively.

The other ends of the coiled portions 16a and 18a of the damper blades 16 and 18, respectively, are each mounted in supported relation on the sidewall 34 of the damper body 30. Inasmuch as the other ends of the coiled portions 16a and 18a of the damper blades 16 and 18, respectively, are each mounted in supported relation on the sidewall 34 of the damper body 30 in an identical manner, it is deemed adequate for purposes of acquiring an understanding of the present invention that there be set forth herein only a description of the manner in which the other end of the coiled portion 18a of the damper blade 18 is mounted in supported relation on the sidewall 34 of the damper body 30. To this end, as best seen with reference to FIG. 4 of the drawing, the other end of the coiled portion 18a of the damper blade 18 in accordance with the illustrated embodiment of the invention is mounted in supported relation on the sidewall 34 of the damper body 30 by means of a pivot pin set generally designated by the reference numeral 64. The pivot pin set 64 as depicted in FIG. 4 of the drawing consists of a housing denoted by the reference numeral 66 that is secured to the outer surface of the sidewall 34 in juxtaposed relation to an opening (not shown) that is suitably provided for a purpose yet to be described. The housing 66 may be secured to the sidewall 34 through the use of any conventional form of securing means suitable for use for such a purpose such as by the housing 66 being welded to the sidewall 34. Cooperatively associated with the housing 66 is a pin denoted by the reference numeral 68 which as seen with reference to FIG. 4 of the drawing is designed to pass through the aforedescribed opening (not shown) in the sidewall 34. The pin 68 is suitably received at one end in a member 70 that is secured within the other end of the coiled portion 18a of the damper blade 18 and is received in threaded engagement at the other end in the housing 66. Finally, by way of reiteration it is to be understood that the other end of the coiled portion 16a of the damper blade 16, although it has not been so described herein, is mounted in supported relation on the sidewall 34 of the damper body 30 in the same manner that the other end of the coiled portion 18a of the damper body 18 as has been described hereinbefore is mounted in supported relation on the sidewall 34 of the damper body 30.

Continuing with the description of the nature of the construction and the mode of operation of the nozzle damper assembly 10 of the present invention, attention will next be directed to the damper blade operating means of the nozzle damper assembly 10. As has been set forth herein previously, the nozzle damper assembly 10 may, without departing from the essence of the present invention, be provided with either of two different types of damper blade operating means. Namely, the nozzle damper assembly 10 may embody the manually operated type of damper blade operating means denoted generally by the reference numeral 28 that is utilized in the embodiment of the nozzle damper assembly 10 which is to be found illustrated in FIGS. 2-6 of the drawing. Or, the nozzle damper assembly 10 may embody a pneumatically operated type of damper blade operating means generally designated by the reference numeral 74 that is utilized in the embodiment of the nozzle damper assembly 10 which is depicted in FIGS. 7-10 of the drawing.

Attention will be directed herein first to the manually operated form of damper blade operating means, i.e., the damper blade operating means 28 utilized in the embodiment of nozzle damper assembly 10 depicted in FIGS. 2-6 of the drawing. For this purpose, reference will be had in particular to FIGS. 4 and 6 of the drawing. To this end, the damper blade operating means 28, as best understood with reference to FIG. 4 of the drawing, includes a torque arresting device assembly, generally designated by the reference numeral 76. The torque arresting device assembly 76 in turn includes a lever arm denoted by the reference numeral 78. As best seen with reference to FIG. 6 of the drawing, the lever arm 78 has one end thereof securely fastened, through the use of any conventional form of fastening means (not shown) suitable for use for such a purpose, to the end 42b of the shaft member 42. In a manner to be described more fully hereinafter, the lever arm 78 is operative to impart movement to the shaft member 42 and therethrough to the damper blade 18 with which the shaft member 42 is cooperatively associated.

Continuing with the description of the damper blade operating means 28 utilized in the embodiment of the nozzle damper assembly 10 depicted in FIGS. 2-6 of the drawing, the lever arm 78 is designed to be locked in position such as to thereby fix the angular positions of the damper blades 16 and 18 relative to each other. To this end, the lever arm 78 is locked in position by means of a torque arresting knob denoted by the reference numeral 80 which cooperates with a pair of locking members 82 and 84 such as to effect the capture of the lever arm 78 between the locking members 82 and 84 in the manner shown in FIG. 4 of the drawing. Namely, by releasing the torque arresting knob 80 the lever arm 78 is free to move relative to the locking members 82 and 84 when rotation is imparted to the lever arm 78 whereby the lever arm 78 pivots about the end 42b of the shaft member 42. In accord with the illustrated embodiment of the invention, the locking member 84 preferably is secured to the bearing and stuffing box assembly 44 by virtue of being welded thereto while the locking member 82 in turn preferably is secured to the locking member 84 by virtue of being welded thereto such that a suitably dimensioned space exists between the locking members 82 and 84 so as to permit movement as described hereinbefore of the lever arm 78 between the locking members 82 and 84. Finally, as best seen with reference to FIG. 6 of the drawing, the lever arm 78 bears indicia, denoted generally by the reference numeral 86, on its face through the use of which one may determine the angular position that damper blades 16 and 18 bear relative to the sidewalls 32, 34, 36 and 38 of the damper body 30.

Figure 6:
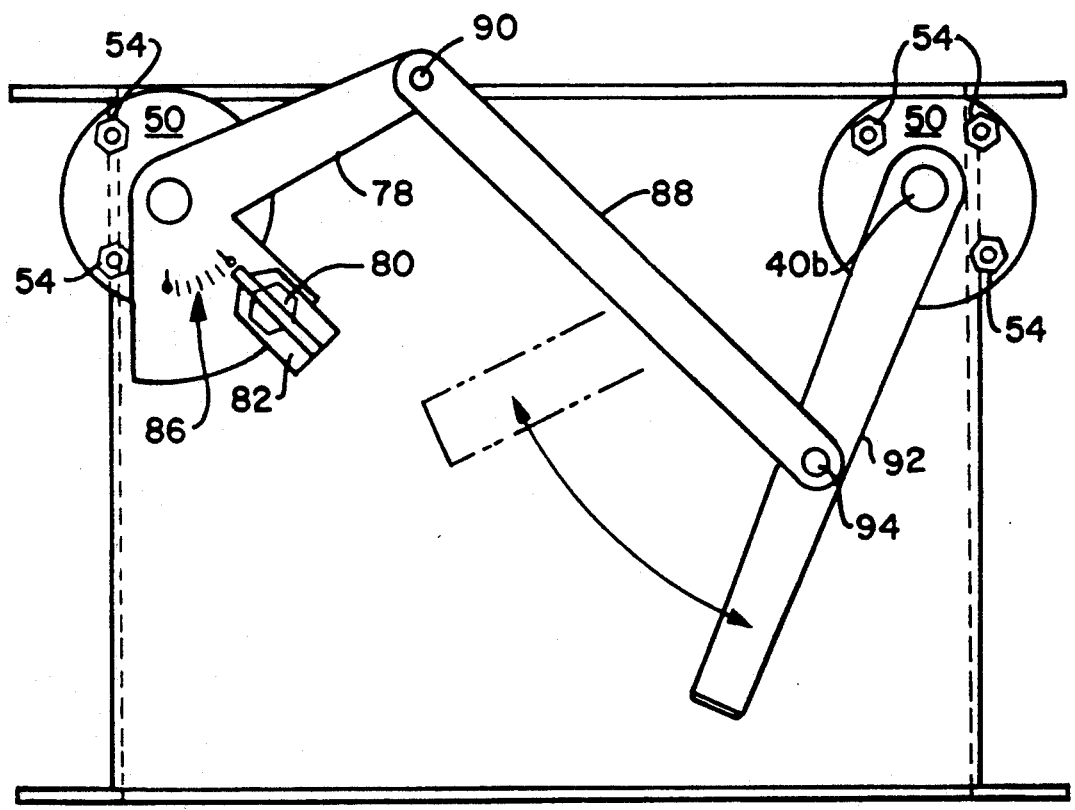
FIG. 6 is a side elevational view of the damper blade operating means of the nozzle damper assembly of the embodiment of FIG. 3 constructed in accordance with the present invention.
Figure 7:
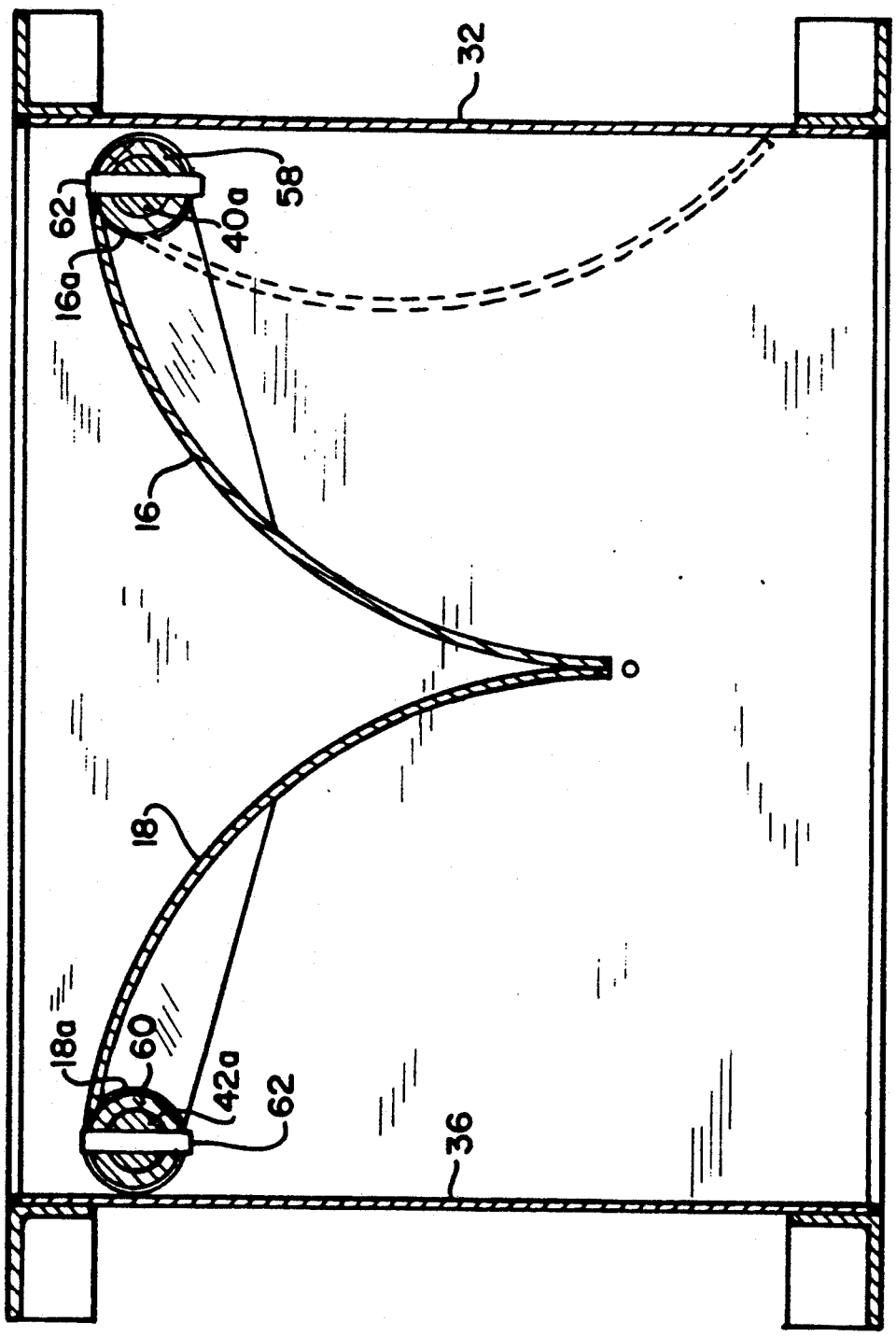
FIG. 7 is a side elevational view in section of the damper means of another embodiment of a nozzle damper assembly constructed in accordance with the present invention.
Figure 8:
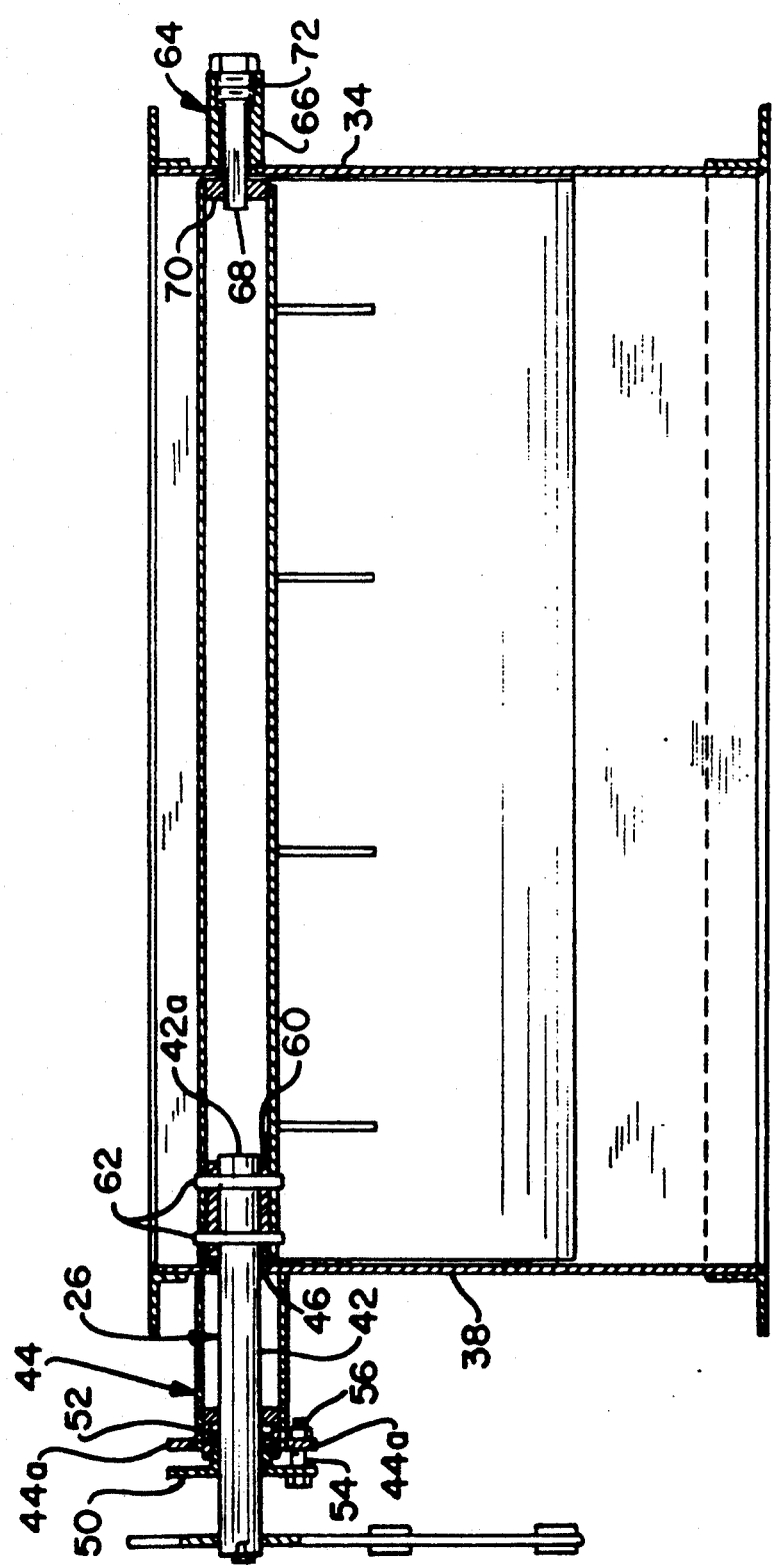
FIG. 8 is a side elevational view in section of the shaft means of the nozzle damper assembly of the embodiment of FIG. 7 constructed in accordance with the present invention.

With further reference to the damper blade operating means 28, the lever arm 78 is fastened at one end thereof to one end of a connecting link 88 through the use of any conventional form of fastening means suitable for use for such a purpose such as through the use of the pin shown at 90 in FIG. 6 of the drawing. The other end of the connecting link 88 is in turn fastened to a handle member denoted by the reference numeral 92 through the use of any conventional form of fastening means suitable for use for such a purpose such as through the use of the pin shown at 94 in FIG. 6 of the drawing. The handle member 92, as best understood with reference to FIG. 6 of the drawing, has one end thereof securely fastened, through the use of any conventional form of fastening means (not shown) suitable for use for such a purpose, to the end 40b of the shaft member 40. As such, the handle member 92 is operative to impart movement to the shaft member 40 and therethrough to the damper blade 16 with which the shaft member 40 is cooperatively associated. Furthermore, the handle member 92 is operative to impart movement to the connecting link 88 and therethrough to the lever arm 78, which as has been described herein previously is operative to impart movement to the damper blade 18. Thus, movement of the handle member 92 caused by manual operation thereof is operative to cause the damper blades 16 and 18 to move in unison to and fro relative to each other.

The pneumatically operated form of damper blade operating means, i.e., the damper blade operating means 74 utilized in the embodiment of nozzle damper assembly 10 depicted in FIGS. 7-10 of the drawing will now be discussed. For purposes of this discussion, reference will be had in particular to FIGS. 8 and 9 of the drawing. Note is also made here of the fact that those components of the nozzle damper assembly 10, which appear in both FIGS. 2-6 and FIGS. 7-10 of the drawing and which are essentially the same, are identified for ease of reference by the same reference numerals in both sets of Figures.

Figure 9:
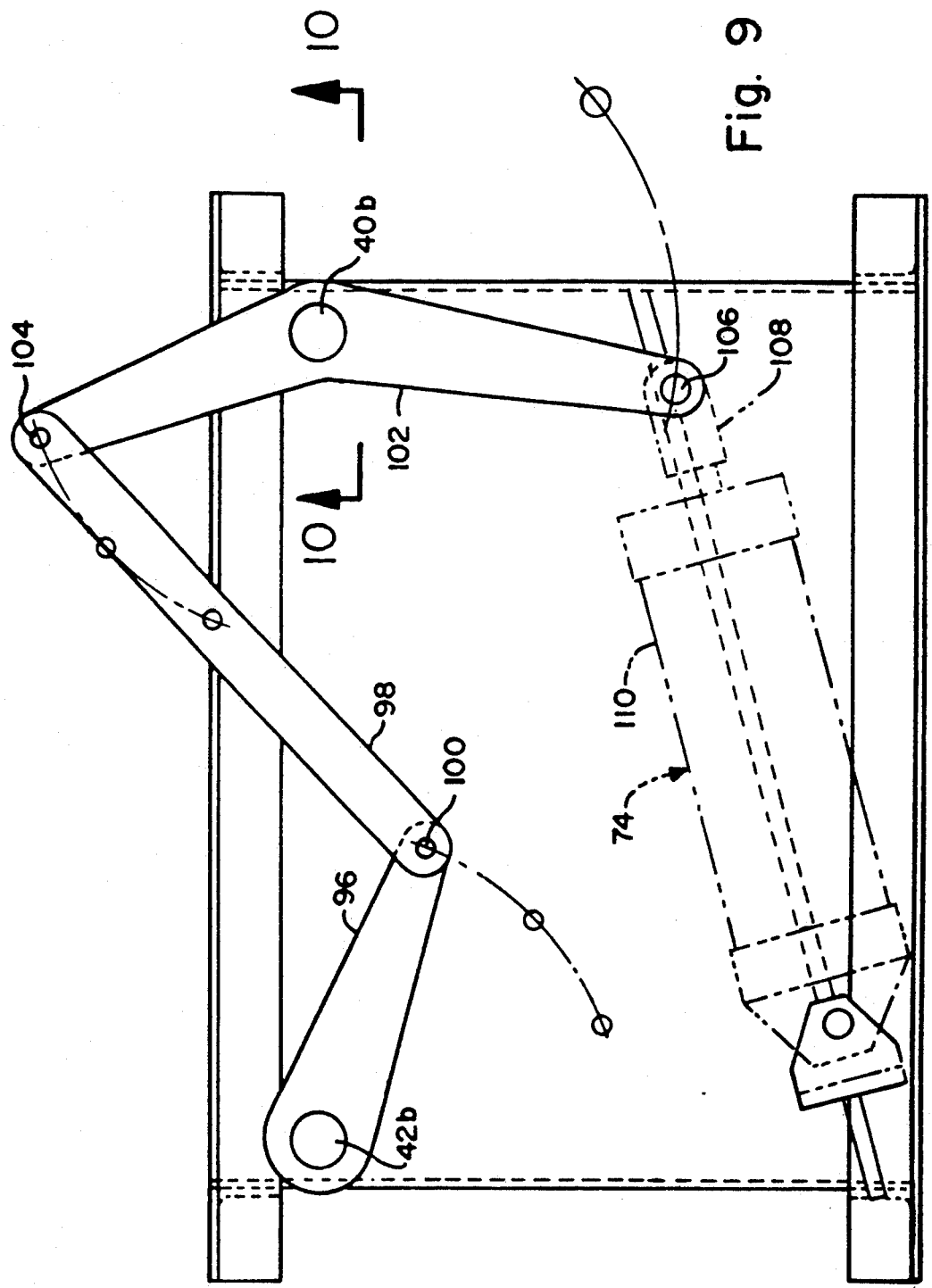
FIG. 9 is a side elevational view of the damper blade operating means of the nozzle damper assembly of the embodiment of FIG. 7 constructed in accordance with the present invention.

The damper blade operating means 74, as best understood with reference to FIG. 9 of the drawing, includes a lever arm denoted by the reference numeral 96. As best seen with reference to FIG. 9 of the drawing, the lever arm 96 has one end thereof securely fastened, through the use of any conventional form of fastening means (not shown) suitable for use for such a purpose, to the end 42b of the shaft member 42. In a manner to be described more fully hereinafter, the lever arm 96 is operative to impart movement to the shaft member 42 and therethrough to the damper blade 18 with which the shaft member 42 is cooperatively associated.

Continuing with the description of the damper blade operating means 74 utilized in the embodiment of the nozzle damper assembly 10 depicted in FIGS. 7-10 of the drawing, the lever arm 96 is fastened at the other end thereof to one end of a connecting link 98 through the use of any conventional form of fastening means suitable for use for such a purpose such as through the use of the pin shown at 100 in FIG. 9 of the drawing. The other end of the connecting link 98 is in turn fastened to a lever denoted by the reference numeral 102 through the use of any conventional form of fastening means suitable for use for such a purpose such as through the use of the pin shown at 104 in FIG. 9 of the drawing.

The lever 102, as best understood with reference to FIG. 9 of the drawing, is securely fastened intermediate the ends thereof, through the use of any conventional form of fastening means (not shown) suitable for use for such a purpose, to the end 40b of the shaft member 40. The other end of the lever 102 is fastened through the use of any conventional form of fastening means suitable for use for such a purpose such as through the use of the pin shown at 106 in FIG. 9 of the drawing to a clevis denoted by the reference numeral 108, which in known fashion is operatively connected to an air cylinder of conventional construction denoted by the reference numeral 110. The air cylinder 110 is supported in mounted relation on the damper body 30 such that movement of the piston of the air cylinder 110 is initiated by movement of the clevis 108 and thereby of the lever 102 in addition, which in turn causes the connecting link 98 connected thereto to also move as well as the lever arm 96 connected to the connecting link 98 whereby the damper blades 16 and 18 are caused to move relative to each other to and fro in unison. Operation of the air cylinder 110 may be initiated in many ways. For example, the air cylinder 110 can be connected in circuit relation with the pressure sensing equipment 20 and 22 of the flow measurement means of the nozzle damper assembly 10 such that in response to signals transmitted thereto based on the sensings made by the pressure sensing equipment 20 and 22 the air cylinder 110 can be actuated in order to position the damper blades 16 and 18 as required in order to effectuate the positioning of the damper blades 16 and 18 as required in order to achieve the desired flow rate through the duct 12. On the other hand, the actuation of the air cylinder 110 may be accomplished in any number of other ways, e.g., manually, etc.

Figure 10:
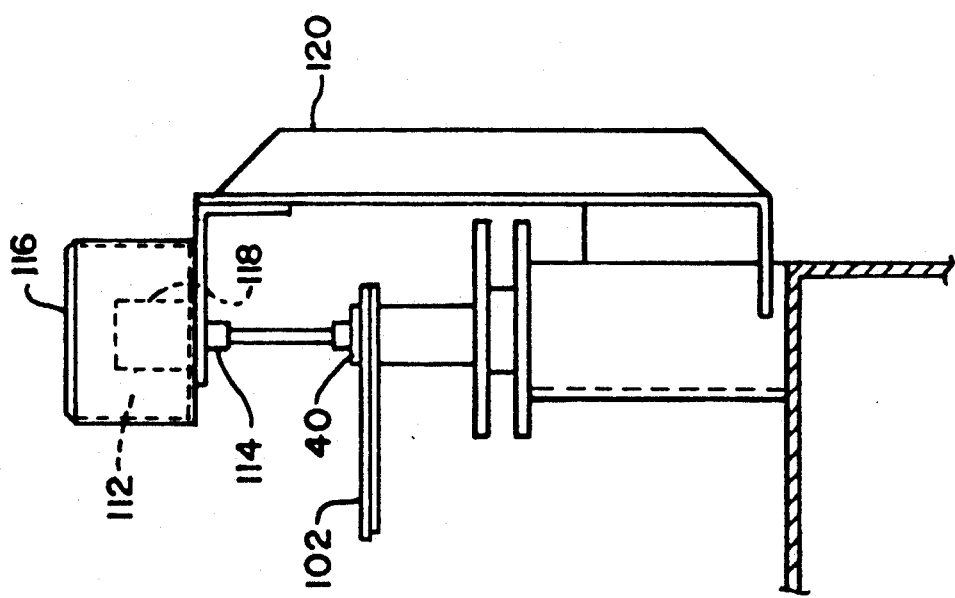
FIG. 10 is a cross-sectional view of a portion of the damper blade operating means of the nozzle damper assembly of the embodiment of FIG. 7 constructed in accordance with the present invention taken substantially along the line 10—10 in FIG. 9.

However, in accord with the illustrated embodiment of the damper blade operating means 74 of the nozzle damper assembly 10 of the present invention, actuation of the air cylinder 110 of the damper blade operating means 74 is effected in the following manner. An electrically operated, preferably a D.C. operated, actuator denoted by the reference numeral 112 is connected, as best understood with reference to FIG. 10 of the drawing, through a coupling device of conventional construction, denoted by the reference numeral 114, to the shaft member 40. As shown in FIG. 10, the D.C. operated actuator 112 is preferably housed in the enclosure denoted by the reference numeral 116. The D.C. operated actuator 112 is thus operative to impart rotation through the coupling device 114 to the shaft member 40. More specifically, the manner in which the electric actuator 112 imparts rotation to the damper shaft member 40 through the coupling device, i.e., connecting link, 114 is as follows. The electrically operated actuator 112, which essentially functions in the manner of an electrically operated solenoid, responds to input from the pressure transmitters, i.e., the pressure sensing equipment 20 and 22, and the rotary encoder, i.e., the position indicator, 118 to trigger the pneumatic, i.e., air, cylinder 110 to impart rotation to the shaft member 40. Once the desired amount of rotation of the shaft member 40 has been achieved, the solenoid, i.e., the electrically operated actuator, 112 halts the pneumatic, i.e., air, drive. The pneumatic, i.e., air, cylinder 110 then holds the damper shaft member 40 (and the damper blades 16 and 18) at this position until receiving input from the electrically operated actuator, i.e., solenoid, 112. Note is made here of the fact that the electrical actuator 112 for the pneumatic, i.e., air, drive need not be attached to the damper shaft member 40 or even to the nozzle damper assembly 10. It may be remotely mounted and air lines run to the pneumatic, i.e., air, cylinder 110. For most applications, however, the electrically operated actuator, i.e., solenoid, 112 would be mounted directly to the pneumatic, i.e., air, cylinder 110.

From the preceding, the following, therefore, should be readily apparent: the electrically operated actuator 112 functions in the manner of an electrically operated solenoid; the electrically operated actuator 112 in functioning in the manner of an electrically operated solenoid is operative to trigger the pneumatic, i.e., air, cylinder 110; the pneumatic, i.e., air, cylinder 110 when so triggered is operated to cause the shaft member 40 to rotate; once the shaft member 40 has been rotated to the desired extent the electrically operated actuator 112 ceases to trigger the pneumatic cylinder 110; when the electrically operated actuator 112 ceases to trigger the pneumatic cylinder 110, the pneumatic cylinder 110 then ceases to impart rotation to the shaft member 40; and when the pneumatic cylinder 110 ceases to impart rotation to the shaft member 40, the pneumatic cylinder 110 effectively holds the shaft member 40 in the position then occupied thereby until such time as the pneumatic cylinder 110 is once again triggered by the electrically operated actuator 112. To thus summarize, it is only when the pneumatic cylinder 110 is triggered by the electrically operated actuator 112 that rotation is imparted to the shaft member 40. As a consequence of this rotation of the shaft member 40, movement is imparted to the lever 102 and therefrom through the connecting link 98 to the lever arm 96. Movement of the lever arm 96 effectuates in turn rotation of the shaft member 42 and concomitantly the positioning of the damper blade 16 that is cooperatively associated therewith. Finally, the air cylinder 110 is operative to maintain the damper blades 16 and 18 fixed in their respective position until such time as the positions of the damper blades 16 and 18 are changed as a consequence of the D.C. operated actuator 112 having once again been actuated. With further reference to FIG. 10 of the drawing, a position indicator seen therein at 118 may be cooperatively associated with the D.C. operated actuator 112 for purposes of enabling one to easily identify the positions then being occupied by the damper blades 16 and 18. In this regard, the position indicator 118 may be secured through the use of conventional fastening means in the form of, for example, conventional threaded fasteners (not shown) in mounted relation on the bracket denoted by the reference numeral 120 in FIG. 10.

The last component of the nozzle damper assembly 10 that has yet to be described herein is the flow measurement means thereof. In accord with the embodiment of the nozzle damper assembly 10 of the present invention illustrated in the drawing, the aforereferenced flow measurement means encompasses pressure sensing equipment depicted schematically at 20 and 22 in FIG. 1 of the drawing. With further reference to FIG. 1, the pressure sensing equipment 20 as depicted therein is designed to be operative to sense the differential pressure in the duct 12 measured across the nozzle damper assembly 10, whereas the pressure sensing equipment 22 as depicted in FIG. 1 is designed to be operative to sense the static pressure in the duct 12 upstream of the nozzle damper assembly 10. These sensings made with the pressure sensing equipment 20 and 22 can in turn be converted in the manner described in detail hereinbefore into measurements of the flow in the duct 12 through the nozzle damper assembly 10. Moreover, the flow measurements thus made can be employed for purposes of establishing the relative positions of the damper blades 16 and 18 of the nozzle damper assembly 10 of the present invention in the duct 12, and thereby enable control to be exercised over the rate at which a gaseous medium is flowing through the duct 12.

Figure 11:
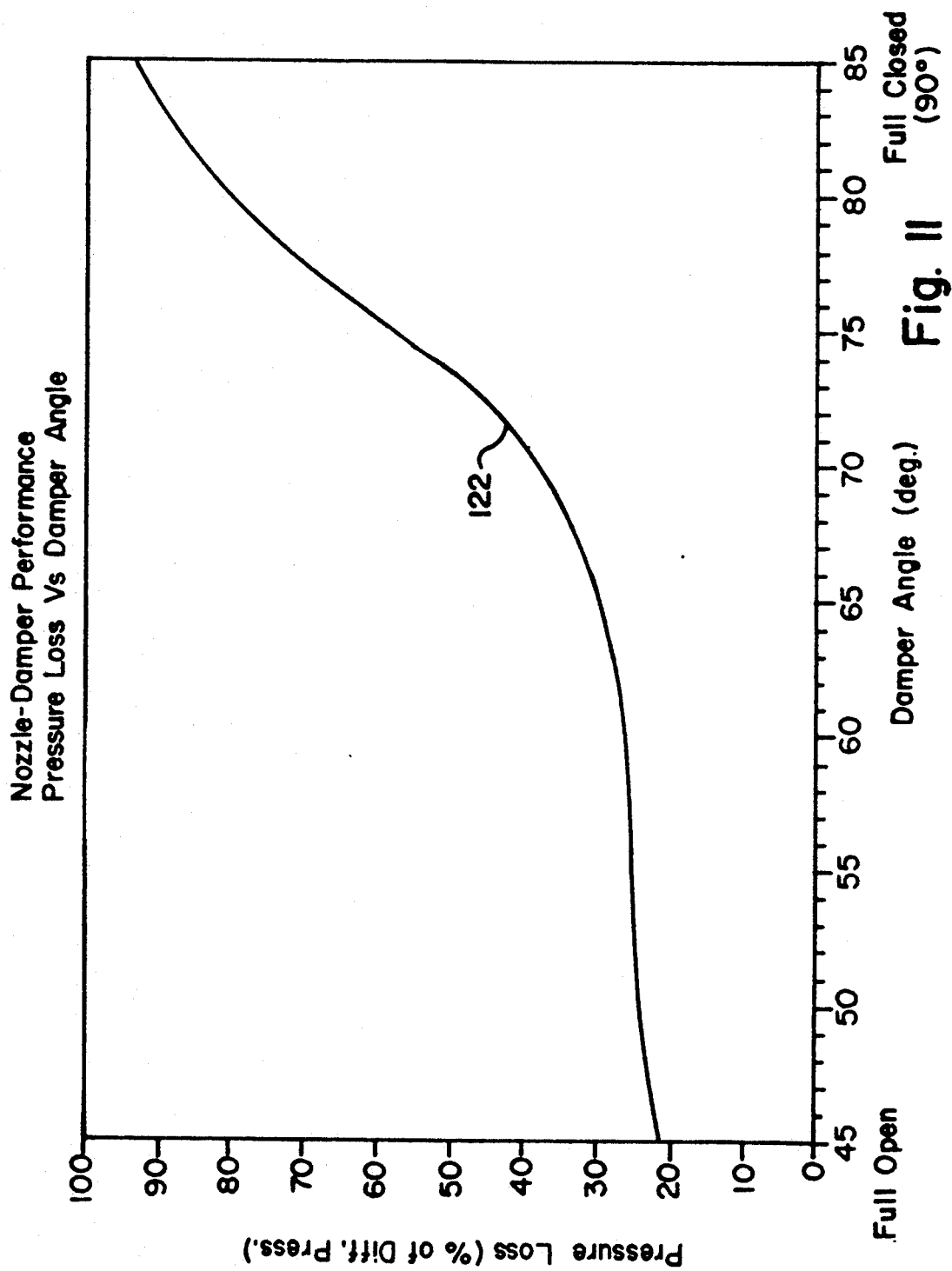
FIG. 11 is a graphical depiction of one aspect of the performance of a nozzle damper assembly constructed in accordance with the present invention wherein pressure loss, i.e., percentage of differential pressure, is plotted against damper angle expressed in degrees.
Figure 12:
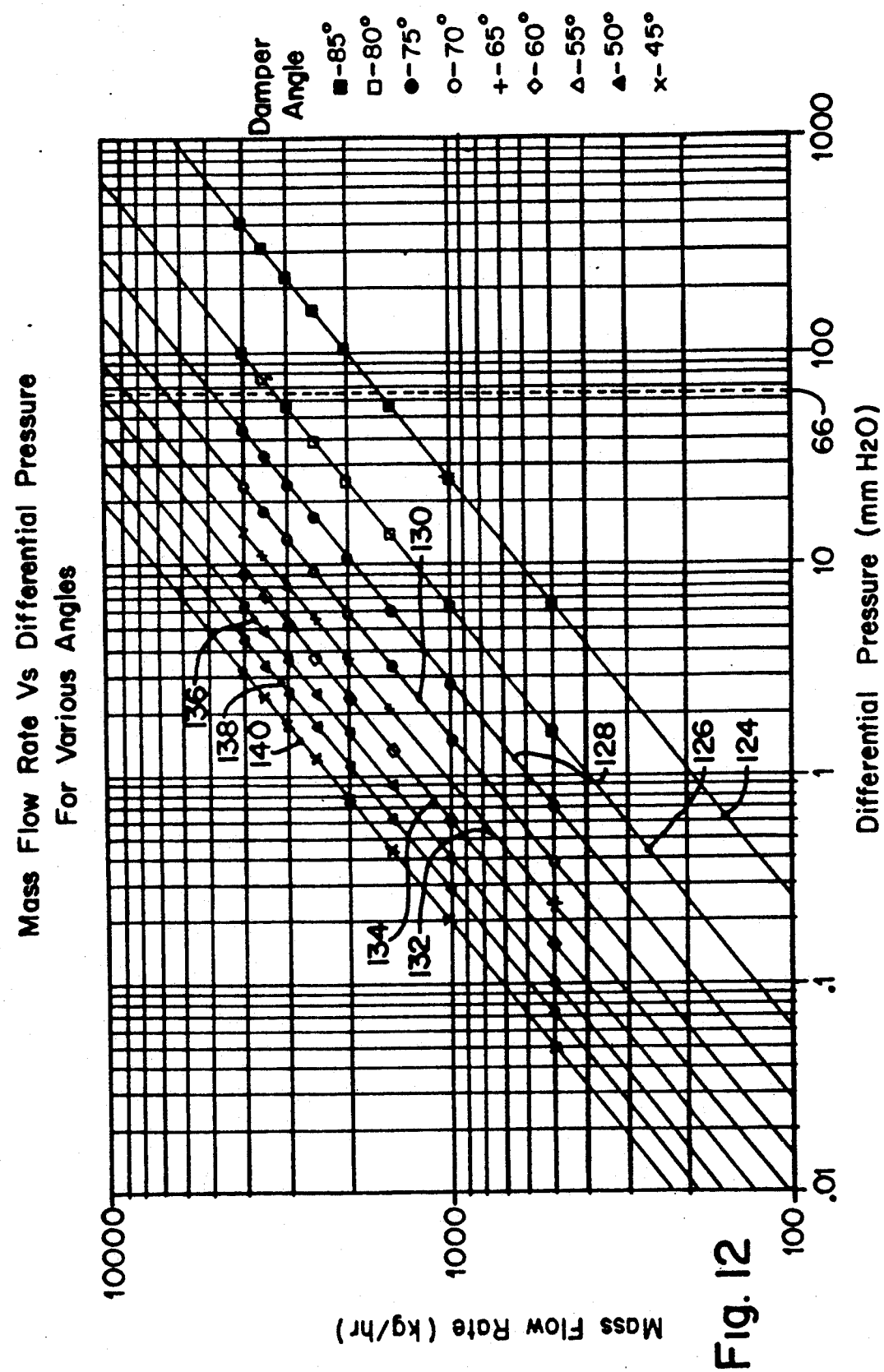
FIG. 12 is a graphical depiction of another aspect of the performance of a nozzle damper assembly constructed in accordance with the present invention wherein mass flow rate expressed in kilograms per hour is plotted for various damper angles against differential pressure expressed in millimeters of $H_2O$.

Reference will next be had to FIGS. 11 and 12 of the drawing. FIG. 11 comprises a graphical depiction of one aspect of the performance of the nozzle damper assembly 10 of the present invention. Namely, the line denoted by the reference numeral 122 is a plot of the pressure loss measured as a percentage of differential pressure plotted against damper angle expressed in degrees wherein the damper angle referred to herein is that of the damper blades 16 and 18 of the nozzle damper assembly 10 of the present invention measured relative to the sidewalls 32, 34, 36 and 38 of the damper body 30 with the nozzle damper assembly 10 being installed in a duct such as the duct 12 depicted in FIG. 1 of the drawing.

FIG. 12 comprises a graphic depiction of another aspect of the performance of the nozzle damper assembly 10 of the present invention. To this end, FIG. 12 comprises a plurality of plots of mass flow rate expressed in kilograms per hour plotted against differential pressure expressed in millimeters of $H_2O$ for various damper angles. More specifically, in FIG. 12 the lines 124, 126, 128, 130, 132, 134, 136, 138 and 140 are such plots of mass flow rate against differential pressure for damper angles of 85°, 80°, 75°, 70°, 65°, 60°, 55°, 50° and 45°, respectively.

Thus, in accordance with the present invention there has been provided a new and improved flow control device that is suitable for use for purposes of effectuating control over the flow of a gaseous medium through a conduit. As well, there has been provided in accord with the present invention a flow control device that possesses the capability of being able to not only control the flow but also the capability of being able to simultaneously measure the flow of a gaseous medium through a conduit. Moreover, in accordance with the present invention there has been provided a flow measuring and control device that is particularly suited for use in measuring and controlling the air flow entering exhauster-type mills. Also, there has been provided in accord with the present invention a flow measuring and control device that is particularly suited for use in measuring and controlling the air flow entering other forms of equipment which are employed in power generation applications. Further, in accordance with the present invention there has been provided a flow measuring and control device that is particularly suited for use in measuring and controlling the flow of a gaseous medium through a conduit which is characterized in that it is possible therewith to handle a wider range of flow rates than that which is possible with a fixed throat area device such as a venturi or flow nozzle. In addition, there has been provided in accord with the present invention a flow measuring and control device that is particularly suited for use in measuring and controlling the flow of a gaseous medium through a conduit which is characterized in that the subject flow measuring and control device possesses the capability of enabling a much wider range of turndown ratios to be attained therewith, e.g., up to 40 to 1, as contrasted to prior art forms of flow control devices which oftentimes have been limited to turndown ratios of 4 to 1. Furthermore, in accordance with the present invention there has been provided a flow measuring and control device that is particularly suited for use in measuring and controlling the flow of a gaseous medium through a conduit which is characterized in that it possesses the capability of being either manually operated or remotely operated. Additionally, there has been provided in accord with the present invention a flow measuring and control device that is particularly suited for use in measuring and controlling a gaseous medium through a conduit which is characterized in that it is relatively short in length so as to, therefore, facilitate its installation in a conduit. Penultimately, in accordance with the present invention there has been provided a flow measuring and control device that is particularly suited for use in measuring and controlling the flow of a gaseous medium through a conduit which is characterized in that it embodies a modular form of construction thereby facilitating the manufacture, transport and installation thereof. Finally, there has been provided in accord with the present invention a flow measuring and control device that is particularly suited for use in measuring and controlling the flow of a gaseous medium through a conduit which is equally applicable for employment in new installations as well as in retrofit applications.

While several embodiments of our invention have been shown, it will be appreciated that modifications thereof, some of which have been alluded to hereinabove, may still be readily made thereto by those skilled in the art. We, therefore, intend by the appended claims to cover the modifications alluded to herein as well as all the other modifications which fall within the true spirit and scope of our invention.

What is claimed is:

1. A nozzle damper assembly for installation in a duct operative for measuring and controlling the flow of a gaseous medium through the duct comprising:
   a. enclosure means mountable in installed relation at a location along the length of the duct, said enclosure means including a damper body embodying four sidewalls with two of said four sidewalls extending in parallel relation to one another and in perpendicular relation to the other two of said four sidewalls;
   b. shaft means supported for movement in said enclosure means, said shaft means including a pair of shaft members supported in spaced relation one to another;
   c. damper blade means mounted on said shaft means for rotatable movement within said enclosure means, said damper blade means including a pair of damper blades, each one of said pair of damper blades comprising a 90° arc and having a radius equal to one-half of the height of the duct, each of said pair of damper blades further having a fixed end and a free end, one of said pair of damper blades having said fixed end thereof mounted on one of said pair of shaft members for movement therewith and the other one of said pair of damper blades having said fixed end thereof mounted on the other one of said pair of shaft members for movement therewith;
   d. damper blade operating means operatively connected to said damper blade means, said damper blade operating means being operative to effect the movement of each one of said pair of damper blades between a first position and a second position such that when each one of said pair of damper blades occupies the first position thereof said free end of one of said pair of damper blades is positioned in abutting relation to one of said sidewalls of said damper body and said free end of the other one of said pair of damper blades is positioned in abutting relation to another one of said sidewalls of said damper body and when each one of said pair of damper blades occupies the second position thereof said free ends of said pair of damper blades are positioned in abutting relation to each other, said damper blade operating means including a lever arm, a connecting link, a handle member and locking means, said lever arm being connected intermediate its ends to one of said pair of shaft members, said lever arm also having one end thereof connected to one end of said connecting link, said handle member having one end thereof connected to the other one of said pair of shaft members, said handle member also being connected intermediate its ends to the other end of said connecting link such that when said handle member is moved both of said pair of shaft members are rotatrd so as to cause said pair of damper blades to move in unison to and from relative to each other, said locking means having a locking position and an unlocking position, said locking means when in the locking position thereof being operative to lock said lever arm against movement and thereby causing said pair of shaft members as well as said connecting link and said handle member also to be locked against movement and when in the unlocking position thereof said locking means being operative to free said lever arm for movement thereby enabling said lever arm as well as said connecting link and said pair of shaft members to undergo movement in response to said handle member being moved; and
   e. flow measurement means operative to measure the flow of the gaseous medium through the nozzle damper assembly such that control can be exercised over the flow of the gaseous medium through the damper assembly and thereby through the duct based on the measurements obtained through the operation of said flow measurement means, said flow measurement means including first pressure sensing equipment located upstream of said fixed ends of said pair of damper blades and second pressure sensing equipment located at the position occupied by said free ends of said pair of damper blades when said free ends of said pair of damper blades are in the second position thereof.

2. The nozzle damper assembly as set forth in claim 1 further comprising bearing and packing means supported in mounted relation to said one of said pair of shaft members to which said lever arm is connected, said bearing and packing means including a bearing and stuffing assembly, a U-shaped member, a packing gland, packing material and fastening means, said bearing and stuffing assembly having a plurality of outwardly projecting lugs and being supported on the outer surface of one of said sidewalls of said damper body so as to be positioned in encircling relation to a portion of said one of said pair of shaft members to which said lever arm is connected, said U-shaped member being supported in mounted relation on said portion of said one of said pair of shaft members so as to be interposed between the outer surface of said portion of said one of said pair of shaft members and the inner surface of said bearing and stuffing assembly, said packing gland being supported in mounted relation on said portion of said one of said pair of shaft members in spaced relation to said U-shaped member, said packing material being positioned between said packing gland and said U-shaped member in surrounding relation to said portion of said one of said pair of shaft members, and said fastening means being operative to fasten together said packing gland and said U-shaped member.

3. The nozzle damper assembly as set forth in claim 2 wherein said locking means comprises a torque arresting device assembly, said torque arresting device assembly including a first locking member, a second locking member and a torque arresting knob, said first locking member being mounted on said bearing and stuffing assembly, said second locking member having a first portion secured to said first locking member and a second portion located in spaced relation to said first locking member such that a space is created between said first locking member and said second portion of said second locking member for receiving said lever arm therewithin, said torque arresting knob being mounted on said second portion of said second locking member for movement between a first position and a second position, said torque arresting knob when in the first position thereof being operative to lock said lever arm between said first locking member and said second portion of said second locking member so as to prevent said lever arm from moving, and said torque arresting means when in the second position thereof being operative to release said lever arm for movement between said first locking member and said second portion of said second locking member.

4. A nozzle damper assembly for installation in a duct operative for measuring and controlling the flow of a gaseous medium through the duct comprising:

a. enclosure means mountable in installed relation at a location along the length of the duct, said enclosure means including a damper body embodying four sidewalls with two of said four sidewalls extending in parallel relation to one another and in perpendicular relation to the other two of said four sidewalls;

b. shaft means supported for movement in said enclosure means, said shaft means including a pair of shaft members supported in spaced relation one to another;

c. damper blade means mounted on said shaft means for rotatable movement within said enclosure means, said damper blade means including a pair of damper blades, each one of said pair of damper blades comprising a 90° arc and having a radius equal to one-half of the height of the duct, each of said pair of damper blades further having a fixed end and a free end, one of said pair of damper blades having said fixed end thereof mounted on one of said pair of shaft members for movement therewith and the other one of said pair of damper blades having said fixed end thereof mounted on the other one of said pair of shaft members for movement therewith;

d. damper blade operating means operatively connected to said damper blade means, said damper blade operating means being operative to effect the movement of each one of said pair of damper blades between a first position and a second position such that when each one of said pair of damper blades occupies the first position thereof said free end of one of said pair of damper blades is positioned in abutting relation to one of said sidewalls of said damper body and said free end of the other one of said pair of damper blades is positioned in abutting relation to another one of said sidewalls of said damper body and when each one of said pair of damper blades occupies the second position thereof said free ends of said pair of damper blades are positioned in abutting relation to each other, said damper blade operating means including a lever arm, a connecting link, a lever, pneumatic cylinder means and initiating means, said lever arm having one end thereof connected to one of said pair of shaft members and having the other end thereof connected to one end of said connecting link, said lever having one end thereof connected to the other end of said connecting link and having the other end thereof connected to said pneumatic cylinder means, said lever also being connected intermediate the ends thereof to the other one of said pair of shaft members, said initiating means being operatively connected to said pneumatic cylinder means, said initiating means in response to a signal being provided thereto being operative to initiate operation of said pneumatic cylinder means and therethrough the rotation of said pair of shaft members so as to thereby cause said pair of damper blades to move in unison to and fro relative to each other; and e. flow measurement means operative to measure the flow of the gaseous medium through the nozzle damper assembly such that control can be exercised over the flow of the gaseous medium through the damper assembly and thereby through the duct based on the measurements obtained through the operation of said flow measurement means, said flow measurement means including first pressure sensing equipment located upstream of said fixed ends of said pair of damper blades and second pressure sensing equipment located at the position occupied by said free ends of said pair of damper blades when said free ends of said pair of damper blades are in the second position thereof.

* * * * *